(12) United States Patent
Wayrynen

(10) Patent No.: US 7,281,728 B1
(45) Date of Patent: Oct. 16, 2007

(54) PONTOON BOAT TRAILER

(76) Inventor: Lynn Gary Wayrynen, P.O. Box 765 - Brush Hill Village, Checotah, OK (US) 74426

( * ) Notice: Subject to any disclaimer, the term of this patent is extended or adjusted under 35 U.S.C. 154(b) by 198 days.

(21) Appl. No.: 11/178,950

(22) Filed: Jul. 11, 2005

(51) Int. Cl.
*B60P 3/10* (2006.01)

(52) U.S. Cl. .............................. 280/414.1; 280/124.158

(58) Field of Classification Search ............ 280/414.1, 280/414.3, 124.169, 124.158; 114/344
See application file for complete search history.

(56) References Cited

U.S. PATENT DOCUMENTS

| | | | |
|---|---|---|---|
| 3,861,716 A | 1/1975 | Baxter et al. | |
| 4,058,325 A | 11/1977 | Schramm | |
| 4,114,772 A | 9/1978 | Beelow | |
| 4,302,022 A | 11/1981 | Schoeffler et al. | |
| 4,637,770 A | 1/1987 | Swadell | |
| 4,801,153 A | 1/1989 | Wilson | |
| 5,015,004 A | 5/1991 | Mitchell | |
| 5,765,859 A | 6/1998 | Nowell et al. | |
| 6,003,888 A | 12/1999 | Godbersen | |
| 6,439,145 B1 | 8/2002 | Mensch | |

*Primary Examiner*—Tony Winner
(74) *Attorney, Agent, or Firm*—Molly D. McKay

(57) ABSTRACT

A trailer for transporting a pontoon boat behind a tow vehicle. The trailer is provided with wheel assemblies that can be moved longitudinally on the trailer's frame to adjust the load on the tongue of the trailer and is provided with rails that can be adjusted in width for receiving the pontoons of boats with different pontoon spacing. The trailer frame can be pneumatically raised and lowered on pivoting wheel brackets and each set of pontoon rails is provided with several pneumatically retractable rollers that can be raised and retracted relative to their associated rails to assist in loading and unloading a pontoon boat from the trailer. When the boat is not being transported, the rails and associated rollers can be removed from the trailer so that the trailer can function as a flatbed trailer.

6 Claims, 5 Drawing Sheets

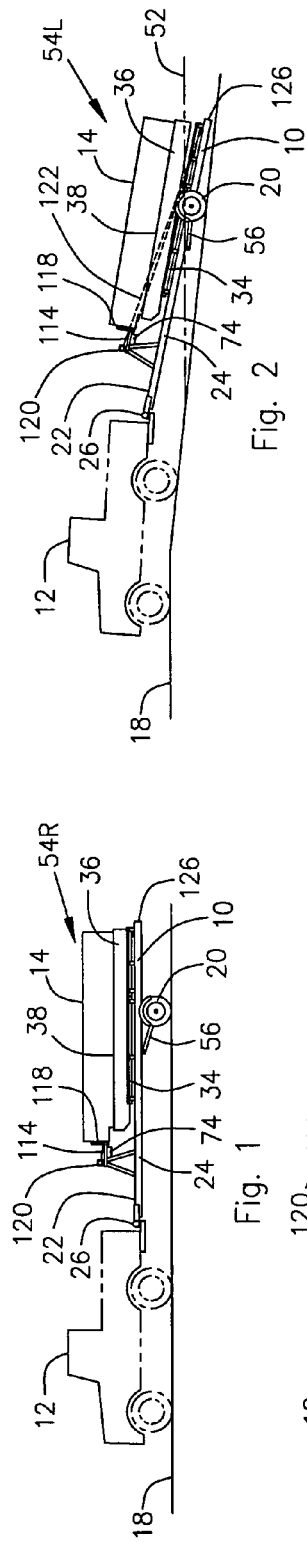
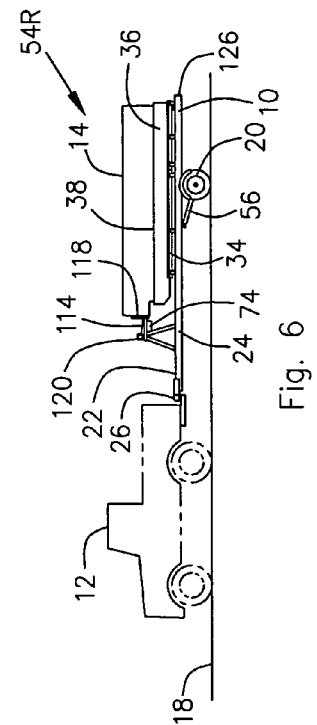
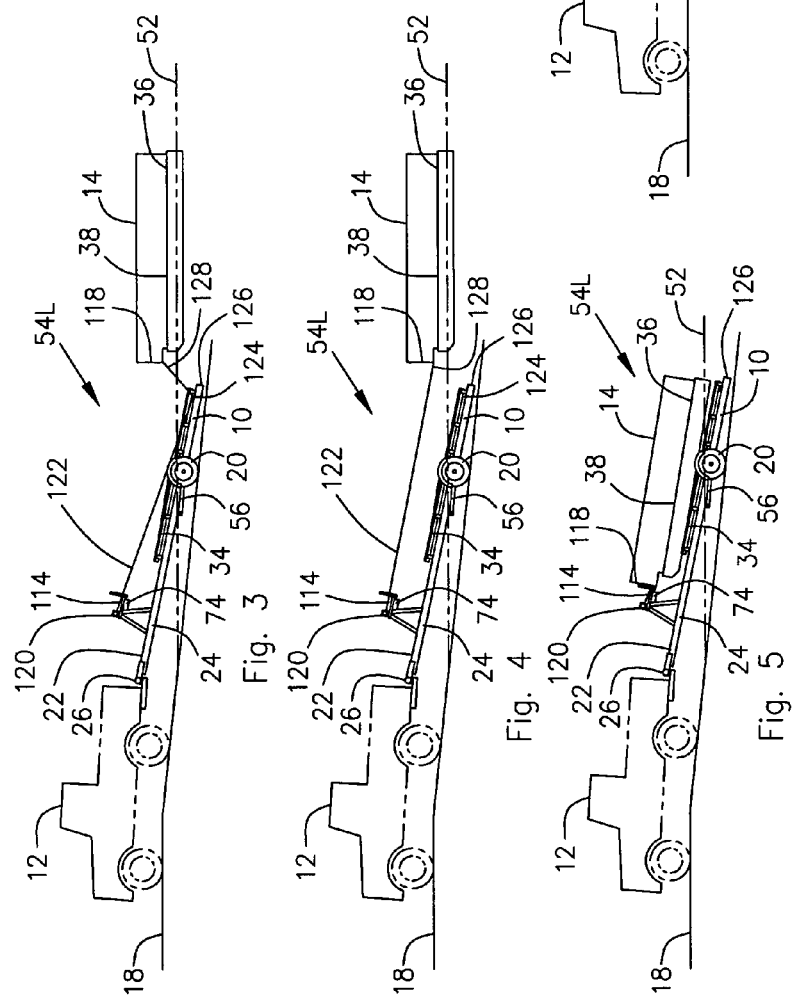
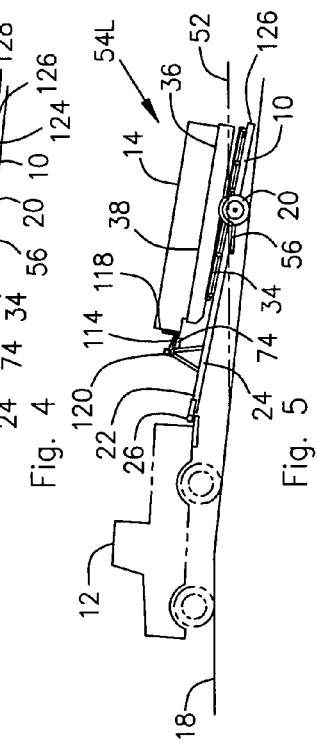

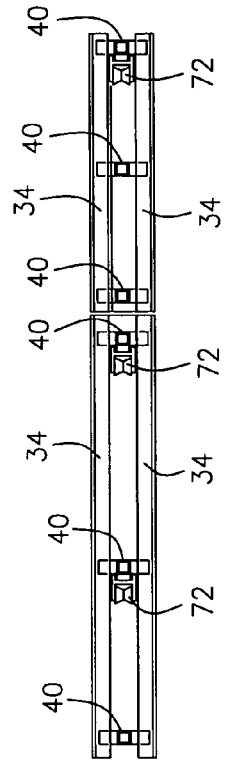
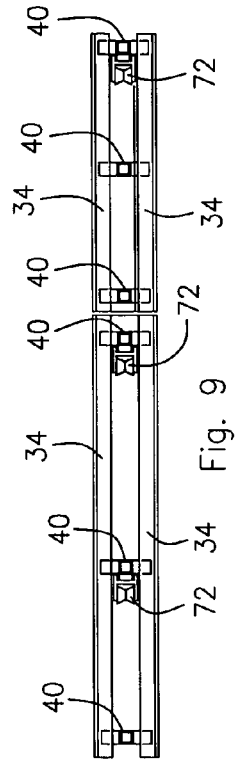
Fig. 9
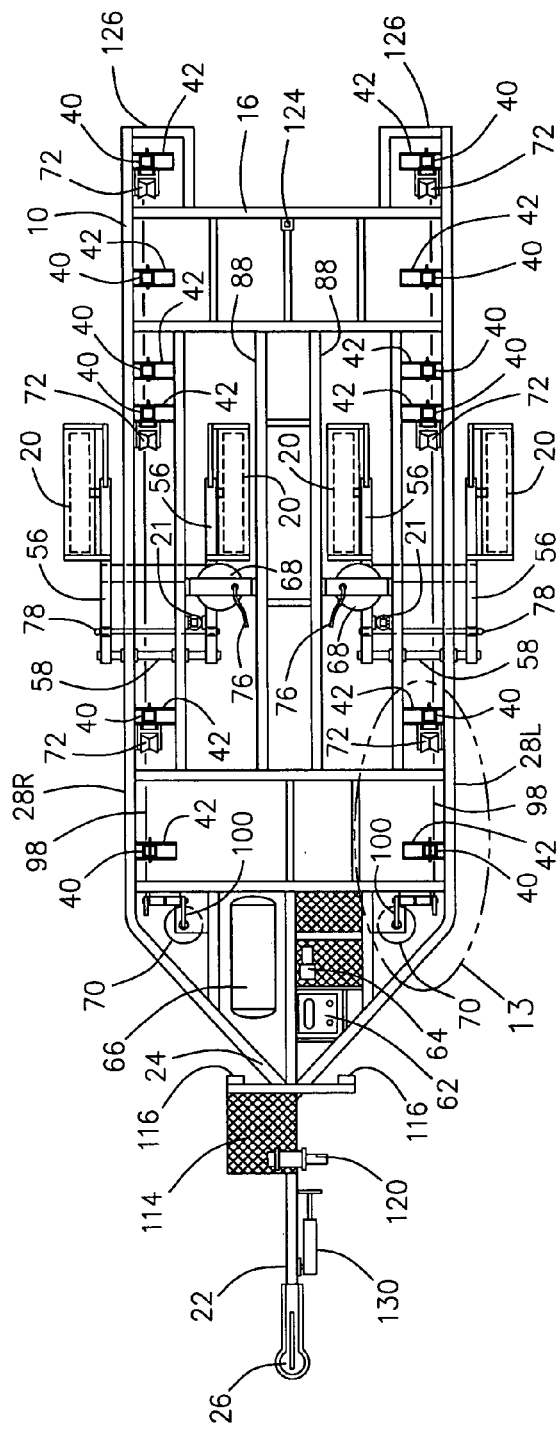
Fig. 10

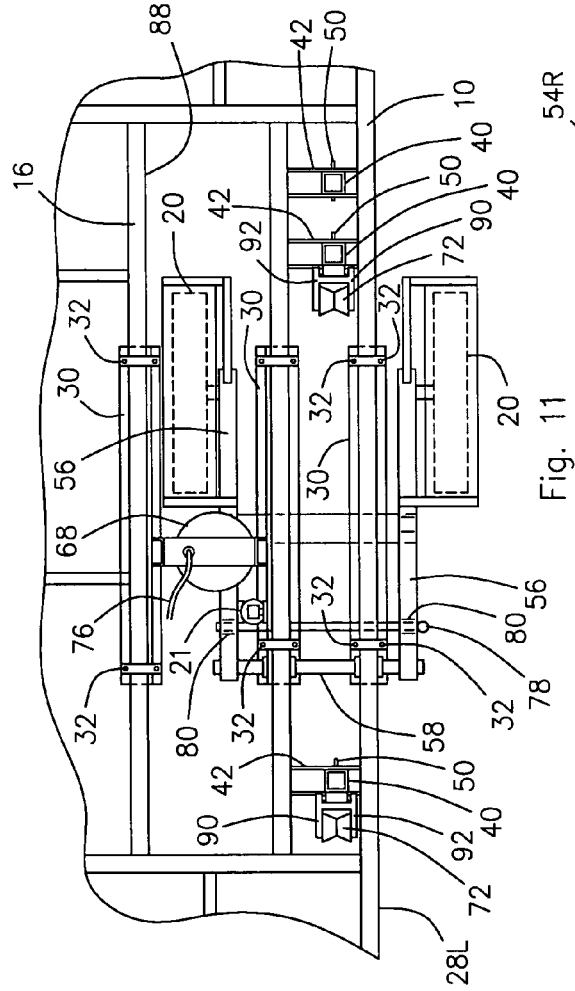
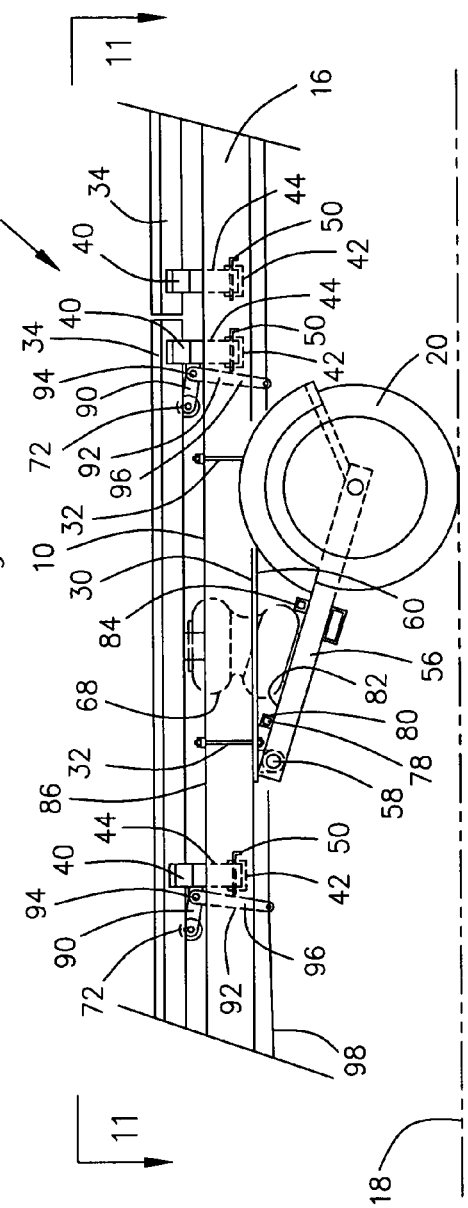

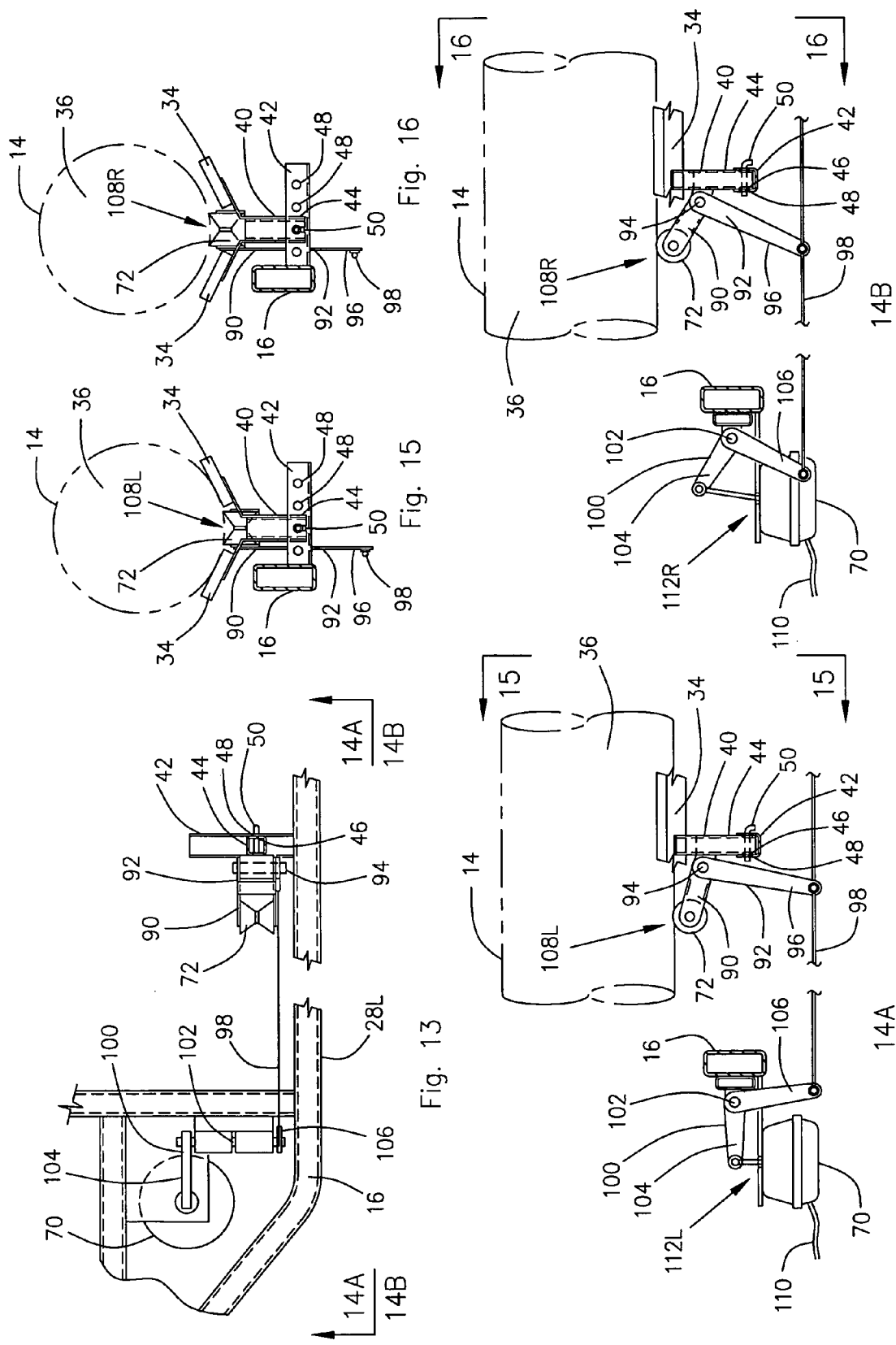

PONTOON BOAT TRAILER

BACKGROUND OF THE INVENTION

1. Field of the Invention

The present invention relates to a pontoon boat trailer for transporting a pontoon boat. More specifically, the present invention is a boat trailer that can be adjusted in several ways to accommodate pontoon boats of differing sizes. The trailer is provided with wheels that can be adjusted longitudinally on the trailer's frame and with rails for receiving the pontoons that are adjustable in width to match the spacing of the boat's pontoons. The trailer frame is pneumatically raised and lowered relative to the ground and each rail is provided with retractable rollers that can be raised and retracted relative to its associated rail to assist in loading and unloading a pontoon boat from the trailer. When the trailer is not in use in transporting a pontoon boat, the rails and associated rollers can be removed from the trailer and by adding a plywood floor to the remaining trailer frame, the trailer can be used as a flatbed trailer.

2. Description of the Related Art

Currently available trailers for transporting pontoon boats have several disadvantages. First, they are elevated on wheels that allow the boat to be transported by the trailer. Because the boat's pontoons are approximately two feet off the ground when the boat is resting on the rails of current pontoon boat trailers and it is difficult to load and unload the boat from the trailer onto the ground or into the water from the boat's elevated position on the trailer. Thus it would be desirable to have a pontoon boat trailer that could be easily raised and lowered relative to the ground.

The present invention addresses this problem by providing a trailer frame that can be raised and lowered relative to the supporting wheels to effectively lower the trailer frame to within approximately 5 inches of the ground from a raised transport position where the trailer frame is located approximately 24 inches above the ground.

Second, in loading and unloading a pontoon boat from currently available pontoon boat trailers, the pontoons of the boat normally must be slid onto rails that are provided longitudinally on the trailer. There are normally two sets of these rails, with one set located on either side of the trailer. The two sets of rails are designed to receive and cradle the boat's pontoons as the boat is being transported on the trailer. Although these rails are normally covered with a cushioning material, such as a carpet scrap, the pontoons can sometimes be damaged as they slide along the rails when the boat is loaded and unloaded onto the trailer.

Thus it would be desirable to have a means of loading the pontoons onto the rails and unloading the pontoons from the rails that did not require sliding the pontoons along the surface of the rails. The present invention addresses this need by providing pneumatically controlled, retractable rollers in association with each set of rails. When the rollers are extended above the rails, they serve as a point of contact for the pontoons as the boat is loaded and unloaded from the trailer.

In order to load a boat onto the present trailer, the rollers are first extended and the pontoons of the boat are then rolled onto the rollers until the boat is properly positioned longitudinally on the trailer. Then the rollers are retracted below the rails, thereby lowering the pontoons onto the rails of the trailer. The trailer transports the boat with the pontoons of the boat resting on the rails. In order to unload the boat from the trailer, the rollers are once again extended above the rails, thereby lifting the pontoons of the boat off of the rails and onto the rollers. Once the pontoons are supported on the rollers, the pontoon boat can be removed from the trailer by rolling the pontoons rearward on the rollers until the boat moves off of the back end of the trailer.

Third, currently available pontoon boat trailers are not adjustable in that the wheels are in a fixed position relative to the tongue of the trailer and the wheels can not be moved longitudinally on the trailer in order to balance or control the load on the tongue of the trailer and thus the load that the towing vehicle experiences. It would be desirable to have a trailer with wheels that could be adjusted longitudinally on the trailer so that the operator could adjust the load on the tongue of the trailer by moving the wheels longitudinally relative to the trailer in response to the load that the trailer is carrying. The present invention has wheels that are adjustable longitudinally on the trailer.

Fourth, currently available pontoon trailers are provided with rails that are fixed to the trailer and can not be adjusted in width to match the spacing of the pontoons on different pontoon boats. This prevents an owner of a trailer from being able to transport a variety of different types of pontoon boats with a single trailer. It would be desirable to have rails that are adjustable in width so that rails of a single trailer could be quickly and easily adjusted to allow the trailer to be used with pontoon boats of varying pontoon spacing. The present invention incorporates this feature.

Finally, currently available pontoon trailers are dedicated-function trailers because their rails are not removable. It would be desirable to have a pontoon boat trailer that could be used for other functions when not needed for transporting a pontoon boat. The present invention addresses this problem by having rails and associated rollers that can be removed from the trailer. The user can floor the remaining frame of the trailer, such as with plywood flooring material, so that the trailer can be used as a flatbed trailer.

SUMMARY OF THE INVENTION

The present invention is a pontoon boat trailer that is useful for transporting a pontoon boat. More specifically, the present invention is a boat trailer that can be adjusted in several ways to accommodate pontoon boats of differing sizes and to facilitate loading and unloading boats from the trailer.

The trailer is provided with wheels that can be adjusted longitudinally on the trailer's frame and with rails for receiving the pontoons that are adjustable in width to match the spacing of the boat's pontoons.

The trailer frame is also pneumatically raised and lowered relative to the ground and each set of pontoon rails provided on the trailer is provided with several pneumatic retractable rollers that can be raised and retracted relative to their associated rails to assist in loading and unloading a pontoon boat from the trailer. When the trailer is not in use transporting a pontoon boat, the rails and associated rollers can be removed from the trailer and, by adding a floor to the trailer frame, the trailer can be used as a flatbed trailer.

BRIEF DESCRIPTION OF THE DRAWINGS

FIG. 1 is a side view of a trailer constructed in accordance with a preferred embodiment of the present invention shown with a pontoon boat resting on it and with the trailer secured behind a tow vehicle.

FIG. 2 is a side view of the trailer of FIG. 1 being backed into water and being lowered to the ground and with the winch line running from the winch to a snatch block located at the rear of the trailer and then back to the front of the boat in anticipation of launching the boat from the trailer.

FIG. 3 is a side view of the trailer of FIG. 2 showing the pontoon boat being launched onto the water from the lowered trailer via the winch line that runs through the snatch block located at the rear of the trailer.

FIG. 4 is a side view of the trailer of FIG. 3 shown with the trailer lowered to the ground and with the winch line extending directly from the winch to the front of the boat in anticipation of the boat being loaded onto the trailer.

FIG. 5 is a side view of the trailer of FIG. 4 showing the pontoon boat loaded onto the lowered trailer via the winch line.

FIG. 6 is a side view of the trailer of FIG. 5 showing the pontoon boat one again resting on the raised trailer that has been pulled out of the water by the attached tow vehicle.

FIG. 9 is a top plan view of the rails of the trailer taken along line 9-9 of FIG. 7.

FIG. 10 is a cross sectional view of the trailer taken along line 10-10 of FIG. 7.

FIG. 11 is a top plan view taken along line 11-11 of FIG. 12 showing an enlarged view of the trailer with the rails removed.

FIG. 12 is an enlarge side view of the area contained within circle 12 of FIG. 7.

FIG. 13 is an enlarged and partially cut away view of the area contained within circle 13 of FIG. 10.

FIG. 14A is a side view taken along line 14A-14A of FIG. 13 showing the retractable rollers in their lowered or retracted position and with the boat's pontoon resting on the rails.

FIG. 14B is a side view taken along line 14B-14B of FIG. 13 showing the retractable rollers in their raised or extended position and with the boat's pontoon resting on the rollers.

FIG. 15 is a cross sectional view taken along line 15-15 of FIG. 14A showing the retractable rollers in their lowered or retracted position and with the boat's pontoon resting on the rails.

FIG. 16 is a side view taken along line 16-16 of FIG. 14B showing the retractable rollers in their raised or extended position and with the boat's pontoon resting on the rollers.

DETAILED DESCRIPTION OF THE PREFERRED EMBODIMENT THE INVENTION

Figure 7:
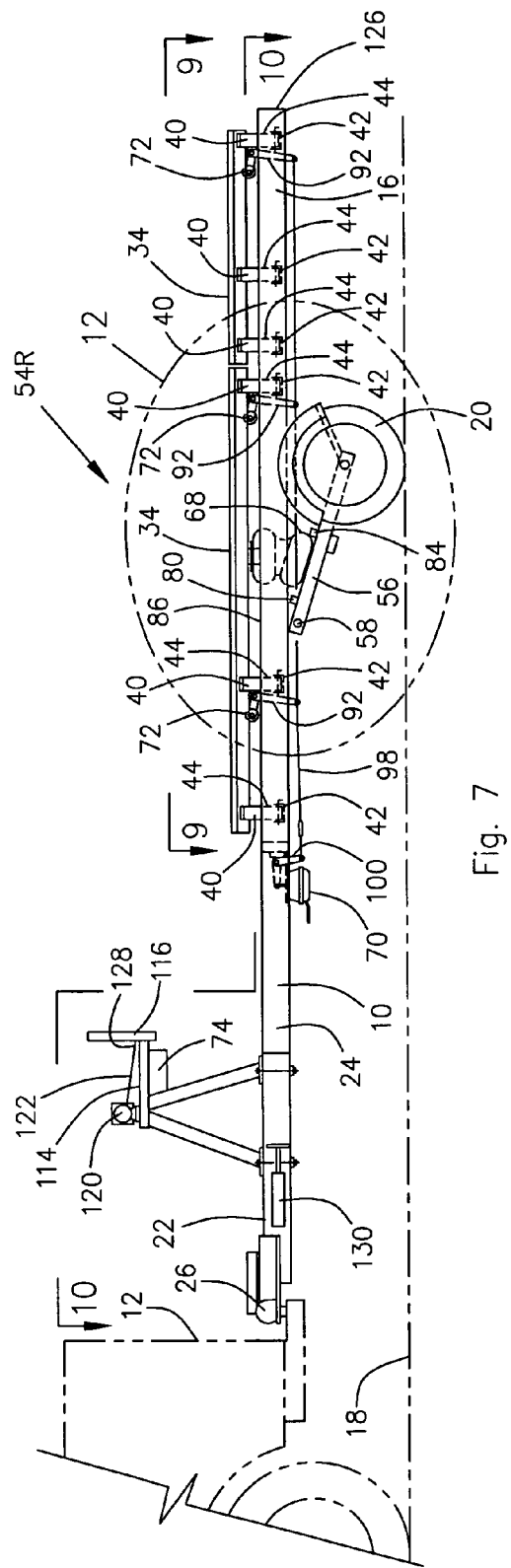
FIG. 7 is an enlarged side view of the trailer of FIGS. 1-6 showing the trailer in its raised position and with the pontoon boat removed.
Figure 8:
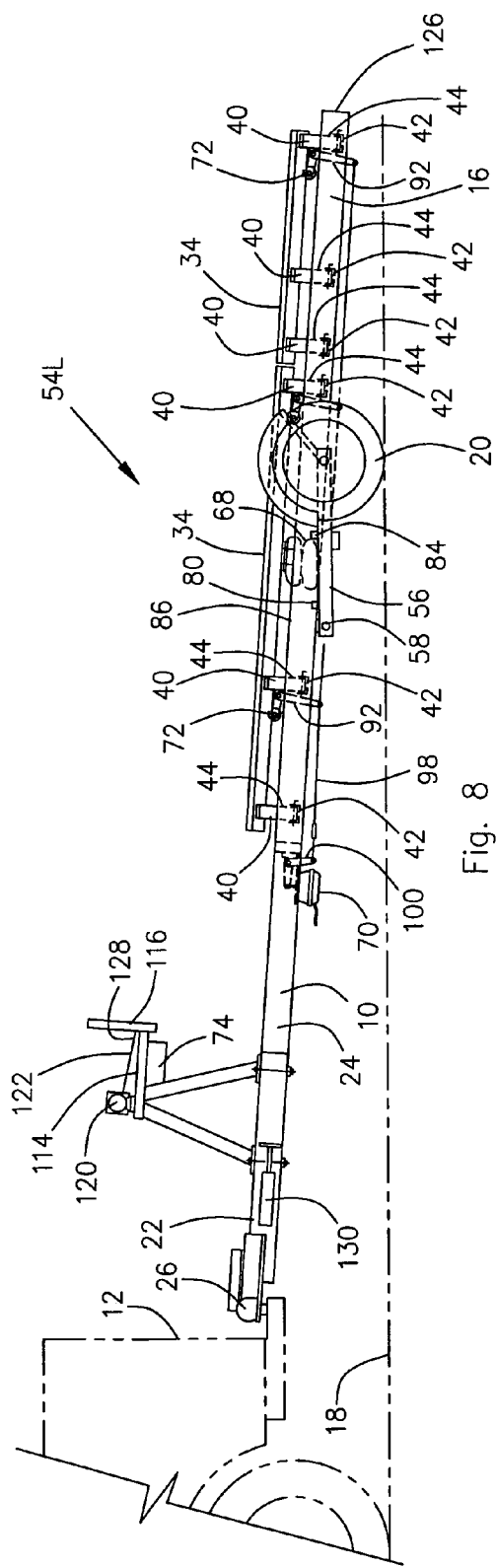
FIG. 8 is a side view of the trailer of FIG. 7 showing the trailer in its lowered position.

Referring now to the drawings and initially to FIGS. 7 and 8, there is illustrated a pontoon boat trailer 10 that can be towed behind a tow vehicle 12 for transporting a pontoon boat 14 on the trailer 10. The boat trailer 10 is provided with a frame 16, best shown in FIG. 10, to which all of the components of the trailer 10 are attached, as will be more fully described hereafter. The frame 16 is supported above the ground 18 by wheels 20. The wheels 20 are provided with shock absorbers 21 that connect between the wheels 20 and the frame 16 of the trailer 10. The trailer 10 is also provided with a tongue 22 at a front end 24 of the trailer 10 and a hitch 26 is incorporated into the tongue 22 for removably attaching the trailer 10 to a tow vehicle 12. The boat trailer 10 that can be adjusted in several ways to accommodate pontoon boats 14 of differing sizes and to facilitate pontoon boats to be loaded onto and unloading off of the trailer 10.

As illustrated in FIGS. 11 and 12, the trailer 10 is provided with two sets of dual wheels 20, with one set of dual wheels 20 provided on each side 28L and 28R of the trailer 10. Each of the sets of wheels 20 is attached to associated wheel brackets 30. The wheel brackets 30 attach to the frame 16 of the trailer via wheel bracket bolts 32 in order to secure the wheel brackets 30 and the attached wheels 20 to the trailer 10. The wheel bracket bolts 32 can first be loosened and then the wheel brackets 30 and their attached wheels 30 can be moved longitudinally as a unit along the trailer's frame 16 to adjust the location of the wheels 20 relative to the trailer's frame 16. Once the wheels 20 are in the desired longitudinal position relative to the trailer's frame 16, the wheel bracket bolts 32 are once again tightened to the wheel brackets 30 in order to secure the wheels 20 at the desired location on the trailer 10. By moving the wheels 20 longitudinally in this manner, the load on the trailer's tongue 22 can thus be adjusted.

Referring to FIGS. 9, 10, 11, and 12, the trailer 10 is provided with two pairs of parallel rails 34 for receiving two pontoons 36 provided on the bottom 38 of the pontoon boat 14. One pair of the rails 34 is located on one side 28L of the trailer 10 and the other pair of rails 34 is located on the opposite side 28R of the trailer 10. The pairs of rails 34 are removably secured to the trailer's frame 16 via rail support brackets 40 that extend downward from each pair of rails 34. Several rail support brackets 40 are provided along the length of each pair of rails 34.

The frame 16 of the trailer 10 is provided with bracket tracks 42 that extend transversely on the trailer 10 in association with each of the rail support brackets 40 so that each a lower end 44 of each rail support bracket 40 is movably received in one of the bracket tracks 42. The rail support brackets 40 can be moved outward distally toward the sides 28L and 28R of the trailer 10 or can be moved inward proximally away from the sides 28L and 28R of the trailer 10 within the bracket tracks 42 in order to adjust the spacing of the sets of rails 34, i.e. in order to move the two pairs of rails 34 further apart or closer together on the trailer 10. By adjusting the spacing of the sets of rails 34 in this manner, the trailer 10 can be adjusted to accommodate pontoon boats 14 having varying pontoon spacing.

As shown in FIGS. 14A, 14B, 15, and 16, the lower ends 44 of the rail support brackets 40 are provided with pin openings 46 there through. The bracket tracks 42 which rest upon the lower ends 44 of the rail support brackets 40 are also provided with pin openings 48 extending there through. Once the rail support brackets 40 are positioned at the desired spacing in the bracket tracks 42, then a pin 50 can be inserted through the aligned pin openings 46 and 48 to secure the rail support brackets 40 to the bracket tracks 42 and the frame 16 of the trailer 10. When thus secured, the width or spacing between the two pairs of rails 34 matches the spacing of the boat's pontoons 36 for the particular size of pontoon boat 14 that is to be transported on the trailer 10.

As illustrated in FIGS. 1-6, the frame 16 of the present trailer 10 can be pneumatically raised and lowered relative to the ground 18 to facilitate unloading and reloading a pontoon boat 14 onto the trailer 10. Although FIGS. 1-6 illustrate the use of the trailer 10 to unload and load a boat 14 between the trailer 10 and water 52, the trailer 10 can also be used to unload and load a boat 14 between the trailer 10 and the ground 18.

Referring now to FIGS. 7 and 8, the raised and lowered positions 54R and 54L of the trailer 10 are illustrated. As previously described and illustrated in FIGS. 11 and 12, the wheels 20 of the trailer 10 are attached to wheel brackets 30 that, along with wheel bracket bolts 32 adjustably secure the wheels 20 to the trailer 10. As shown in FIG. 12, the wheels 20 are movably mounted via wheel support arms 56 to a wheel arm pivot point 58 provided on the bottom 60 of the wheel brackets 30. The wheel arm pivot point 58 allows the wheels 20 to pivot upward when the trailer 10 is lowered toward the ground 18 and to pivot downward when the trailer 10 is raised relative to the ground 18.

The frame 16 of the trailer 10 is provided with a battery 62, preferably a 12 volt battery. The battery 62 is attached to and operates a direct current (DC) air compressor 64. The air compressor 64 is also provided on the frame 16 of the trailer 10 and is preferably a 12 volt air compressor. The air compressor 64 functions to maintain air pressure in an associated air tank 66 to which it is attached and which is also provided on the frame 16 of the trailer 10. The air tank 66 provides the air pressure to operate the pneumatically operated functions of the trailer 10, including supplying air to air balloons 68 for raising and lowering the trailer frame and supplying air to air cylinders 70 for raising and lowering rollers 72 associated with the rails 34, as will be more fully described hereafter.

As shown in FIGS. 7, 8, and 12, air balloons 68 are provided secured between the frame 16 of the trailer 10 and the wheel support arms 56 so that when the air balloons 68 are inflated, the trailer 10 is raised to its raised or transport position 54R and so that when the air balloons 68 are deflated, the trailer 10 is lowered to its lowered or unloading position 54L. Controls for activating and deactivating the air balloons 68 are provided on a control panel 74 located on the tongue 22 of the trailer 10. Because the types and locations of controls on the control panel 74 can vary widely, the details of controls for the control panel 74 are not illustrated.

As illustrated in FIGS. 10, 11 and 12, when the proper control is activated, air flows from the air tank 66 via air lines 76 to the air balloons 68, causing the air balloons 69 to inflate, thereby causing the trailer 10 to move to its raised position 54R, as shown in FIG. 7. Safety rods 78 may be inserted through transverse rod sleeves 80 provided on the top 82 of the wheel support arms 56, as shown in FIGS. 11 and 12, to prevent the trailer 10 from moving downward out of its raised position 54R in the event that the air balloons 68 were to fail. The safety rods 78 extending between adjacent wheel support arms 56 and function by preventing the frame 16 of the trailer 10 from moving downward. The safety rods do this by their engagement with the frame 16 as the wheels 20 attempt to pivot upward and thereby prevent the wheels 20 from moving upward.

In order to move the trailer 10 to its lowered position 54L, the safety rods 78 must first be removed from the transverse rod sleeves 80 on both sides 28L and 28R of the trailer 10. Rod storage sleeves 84 are provided on the lateral or outside wheel support arms 56 on either side 28L and 28R of the trailer 10 as a place where the safety rods 78 can be stored when not in use. After the safety rods 78 have been removed from the transverse rod sleeves 80, then a user can activate another control on the control panel 74 which causes the air balloons 68 to deflate. As the air balloons 68 deflate under the force of gravity, the wheels 20 will pivot upward and the trailer 10 will move downward to its lowered position 54L, as shown in FIG. 8.

The battery 62 is recharged by the tow vehicle 12 to which it is attached via standard trailer electrical connections, not illustrated, that are provided on a tow vehicle 12 that is equipped with a tow package. Alternately, if the tow vehicle 12 is not provided with a tow package, the tow vehicle 12 can be retrofitted with an auxiliary wire, also not illustrated, that extends from the tow vehicle 12 to the trailer 10 as a means of charging the trailer's battery 62 and operating the trailer's lights, also not illustrated.

As shown in FIG. 8, when the trailer 10 is in its lowered or unloading position 54L, the wheels 20 extend upward slightly beyond the top 86 of the frame 16. FIG. 10 shows that the outside wheels 20 of each set of dual wheels 20 are located beyond the sides 28L and 28R of the trailer's frame 16 and the frame 16 is provided with wheel openings 88 therein through which the inside wheels 20 of each set of dual wheels 20 can extend when the trailer 10 is in its unloading position 54L.

Each pair or set of pontoon rails 34 provided on the trailer 10 is provided with several pneumatic retractable rollers 72 located between the pair of rails 34. These rollers 72 can be raised or extended and lowered or retracted relative to their associated rails 34 to assist in loading and unloading a pontoon boat 14 from the trailer 10.

Referring now to FIGS. 13-16, the function of the rollers 72 will be described. Each of the rollers 72 is mounted on an upwardly extending leg 90 of a primary L-shaped arm 92. The primary L-shaped arm 92 has a central pivot point 94 that is pivotally mounted to the rail support brackets 40 located centrally between their associated pair of rails 34 so that the arm 92 is located under the rails 34. As shown in FIG. 14A, an opposite downwardly extending leg 96 of each of the primary L-shaped arms 92 attaches to one of two control cables 98. One of the two control cables 98 is provided on either side 28L and 28R of the trailer 10, and each control cable 98 extends longitudinally on the trailer 10. Each of the control cables 98 originates from one of the two air cylinders 70. As shown in FIG. 10, one of the two air cylinders 70 is provided on either side 28L and 28R of the trailer 10 at the front end 24 of the trailer 10.

Each of the control cables 98 attaches to its associated air cylinder 70 via a secondary L-shaped arm 100. Like the primary L-shaped arms 92, the secondary L-shaped arms 100 are each provided with a central pivot point 102 that is pivotally secured to the frame 16, an upwardly extending leg 104, and a downwardly extending leg 106.

When the air cylinders 70 are in their lower or not activated position 112L, the rollers 72 are in the lower or down position 108L shown in FIGS. 14A and 15 so that the pontoons 36 of a boat that is loaded onto the trailer 10 rest on the rails 34. However, when the operator activates the proper control on the control panel 74, this causes air to simultaneously pass from the air tank 66 via air lines 110 to both of the air cylinders 70, as shown in FIGS. 14A and 14B. The air forces the air cylinders 70 into their activated position 112R, as shown in FIG. 14B. When the air cylinders 70 are thus activated, this pushes the upwardly extending legs 104 further upward, causing the secondary L-shaped arms 100 to pivot at their central pivot points 102. This causes the downwardly extending legs 106 to move forward which pulls the control cables 98 forward. The control cables 98, in turn, pull on the downwardly extending legs 90 of the primary L-shaped arms 92. This causes the primary L-shaped arms 92 to pivot at their central pivot points 94 and further raises the upwardly extending leg 90 and the attached rollers 72 to their raised or activated position 108R. As the rollers 72 are raised to their raised position 108R, as shown in FIGS. 14B and 16, they engage the pontoons 36 that were resting on the two pairs of rails 34, thereby lifting the pontoons 36 upward off of the rails 34 so that the boat 14 is supported on the trailer 10 solely via the elevated rollers 72 on which the boat's pontoons 36 rest.

When thus supported by the rollers 72, the pontoons 36 can be easily rolled forward or backward on the trailer 10 without fear that the pontoons 36 will be damaged by the rails 34 as the pontoons 36 are moved relative to the trailer 10. By having the pontoons 36 elevated on the rollers 72, the boat 14 is much easier to unload from the trailer 10.

Also, having the rollers 72 in their raised position 112R facilitates loading the boat 14 back onto the trailer 10. Once the boat 14 has been reloaded on the trailer 10, the rollers 72 must again be lowered to their deactivated position 112L by employing the proper controls provided on the control panel 74. This allows the pontoons 36 to be placed back down onto the rails 34 so that the boat 14 will rest securely on the rails 34 during transport of the boat 14 on the trailer 10.

When the trailer 10 is not in use transporting a pontoon boat 14, the rails 34 and associated rollers 72 can be removed from the trailer 10. The rails 34 can easily be removed from the trailer 10 simply by removing the securing pins 50 and lifting the rails 34 off of the trailer's frame 16. The rollers 72 and the primary L-shaped arms 92 are secured to the rail support brackets 40 and will be removed from the trailer 10 with their associated rails 34. However, because the primary L-shaped arms 92 are attached to the control cables 98, the primary L-shaped arms 92 should be disconnected from the control cables 98 before attempting to remove the rails 34 from the trailer 10. With the addition of a floor (not illustrated) to the top 86 of the trailer frame 16, once the rails 34 and rollers 72 are removed form the trailer 10, the trailer 10 can then be used as a flatbed trailer. If a floor is to be installed on the top 86 of the trailer's frame 16 so that the trailer 10 can be used as a flatbed trailer, the flooring material should not extend over the frame's wheel openings 88.

The trailer 10 is also provided with a platform 114 located on the tongue 22 of the trailer 10 and on which a user can stand to more easily gain access to the boat 14 while the boat 14 is loaded on the trailer 10. The platform 114 is provided with a rear facing bumper 116 that the front 118 of the boat 14 bumps against it as the boat 14 is loaded onto the trailer 10 and which serves to prevent the boat 14 from being pulled forward too far on the trailer 10 as it is loaded. The bumper 116 also serves as a support against which the front 118 of the boat 14 is secured when the boat 14 is being transported on the trailer 10. A DC powered electric winch 120 is provided on the platform 114 and the control panel 74 for the trailer 10 is also preferably mounted on the platform 114, as illustrated in FIG. 7.

The winch 120 is preferably a 12 volt winch and is provided with a winch cable 122 associated with it. As illustrated in FIGS. 1-3, the winch cable 122 can be placed around a snatch block 124 that can be removable attached at the rear 126 of the trailer 10 before attaching a free end 128 of the winch cable 122 to the front 118 of the boat 14 as a way of pulling the boat 14 rearward off of the trailer 10 in order to unload the boat 14 from the trailer 10. Alternately, as illustrated in FIGS. 4-6, the free end 128 of the winch cable 122 can be attached directly to the front 118 of the boat 14 as a way of pulling the boat 14 forward onto the trailer 10 in order to load the boat 14 onto the trailer 10.

Although not illustrated in detail, the control panel 74 is provided with air pressure gauges, pressure switches, pressure regulators, and control knobs for activating the various functions previously described. Also, optionally, the trailer 10 can be provided with remote means for activation of the various controls functions. Remote means for controlling the winch is particularly desirable.

As with most trailers, the present trailer 10 is provided with a trailer coupler or hitch 26 on the tongue 22 of the trailer 10 by which the trailer 10 can be attached to the tow vehicle 12. Also a fold-up trailer jack 130 is provided on the tongue 22 of the trailer 10 is for supporting the tongue 22 when the trailer 10 when it is detached from the tow vehicle 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A pontoon boat trailer comprising:
    a trailer frame supported on wheels, means for attaching said trailer frame to a tow vehicle, said wheels pivotally attaching to said frame, and pneumatic means provided on said frame for raising and lowering said frame relative to said wheels,
    means for longitudinally adjusting the position of said wheels relative to said frame,
    a spaced apart parallel pair of rails extending longitudinally above said frame on either side of said frame in order to receive pontoons of a pontoon boat thereon, rollers provided between each pair of rails, means to pneumatically raise said rollers above said rails and to lower said rollers below said rails in order to lift said pontoons off of said rails and replace said pontoons on said rails.

2. A pontoon boat trailer according to claim 1 further comprising:
    each said pair of rails adjustably secured to said frame so that each said pair of rails can be moved toward and away from the opposite pair of rails.

3. A pontoon boat trailer comprising:
    a trailer frame supported on wheels, means for attaching said trailer frame to a tow vehicle,
    a spaced apart parallel pair of rails extending longitudinally above said frame on either side of said frame in order to receive pontoons of a pontoon boat thereon, rollers provided between each pair of rails, means to pneumatically raise said rollers above said rails and to lower said rollers below said rails in order to lift said pontoons off of said rails and replace said pontoons on said rails.

4. A pontoon boat trailer according to claim 3 further comprising:
    each said pair of rails adjustably secured to said frame so that each said pair of rails can be moved toward and away from the opposite pair of rails.

5. A pontoon boat trailer according to claim 4 further comprising:
    said wheels pivotally attaching to said frame, and pneumatic means provided on said frame for raising and lowering said frame relative to said wheels.

6. A pontoon boat trailer according to claim 5 further comprising:
    means for longitudinally adjusting the position of said wheels relative to said frame.

* * * * *